Jan. 4, 1938.  E. LEWIS  2,104,465
ELECTRIC COOKER
Filed May 21, 1937
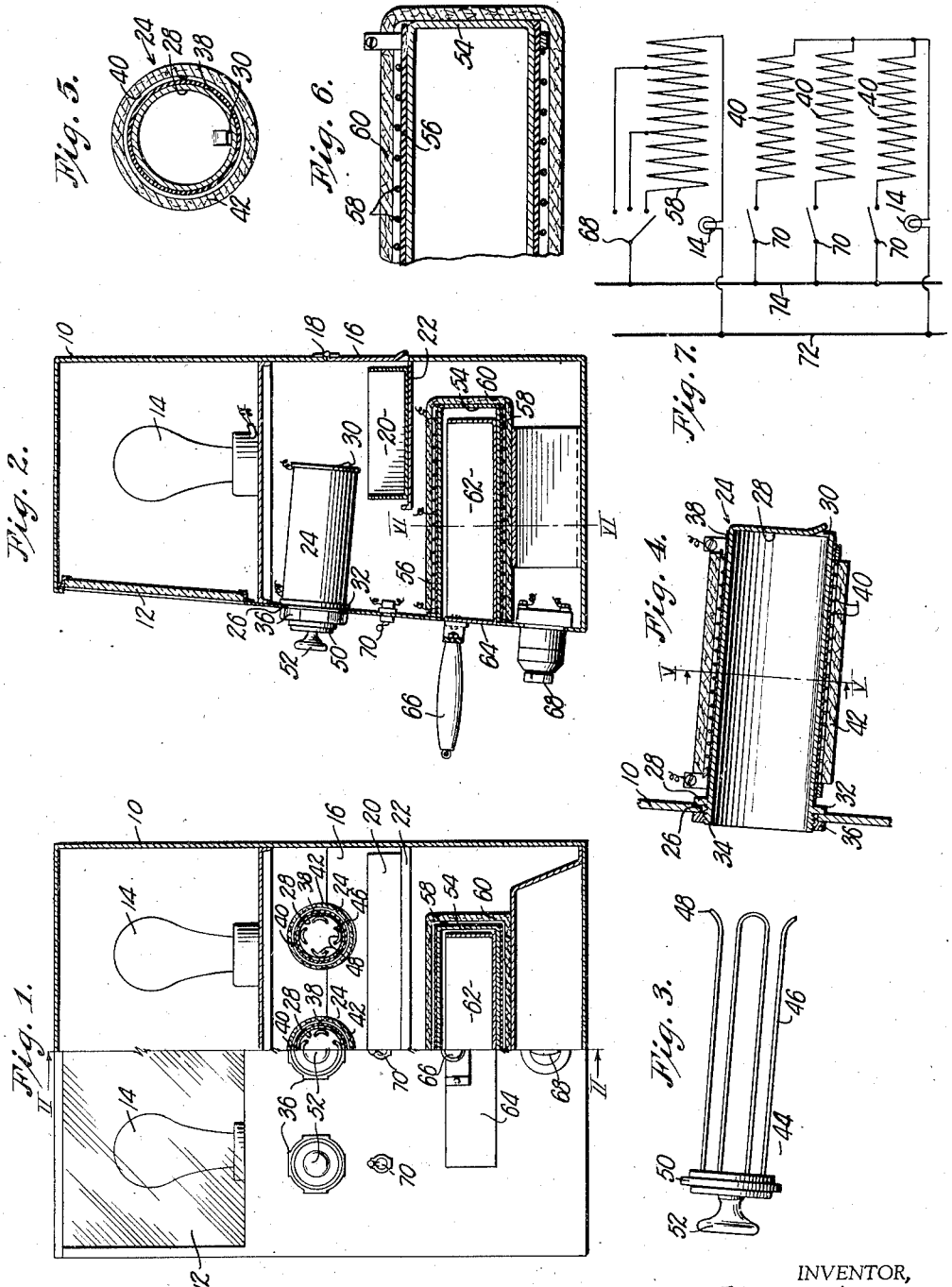
INVENTOR,
Elmer Lewis.
BY
Hovey & Hamilton,
ATTORNEYS.

Patented Jan. 4, 1938

2,104,465

UNITED STATES PATENT OFFICE 2,104,465

ELECTRIC COOKER

Elmer Lewis, Kansas City, Mo.

Application May 21, 1937, Serial No. 143,953

1 Claim. (Cl. 219—19)

This invention relates to electric cookers of the character employed in the preparation of frankfurters, wiener-wurst and hamburgers and the primary object is to provide in a single cooker unique means for preparing any one or all of the above mentioned foods simultaneously or alone.

One of the important aims of this invention is to provide an electrical device for preparing foods of the aforementioned character which device is compact, portable, efficient and easy to operate and is extremely effective in the cooking of foods because of the special disposition of heat units or resistance wires which form a part of the cooker.

One of the important objects of this invention is to provide in an electric cooker a series of closed compartments each of which is circumscribed by a coil of resistance wire so that when the food is placed within the compartment, heat transfer takes place in at least four directions.

A yet further aim of the instant invention is to provide in an electric cooker of the above mentioned type a series of inclined individual housings, each having independently operable circumscribing coils for the purpose of heating and cooking an article of food which is disposed within the housing; said housings being uniquely secured to one side of a specially formed case so that the housings are inclined rearwardly and downwardly toward a drain tray into which may be deposited excess liquid that collects within the case, said case being provided with a drain opening so that the cooking operation is attended by a thorough and complete evacuation from the case of any grease or moisture that might be emitted from the article therein during the cooking operation.

Further objects of the invention will appear during the course of the following specification referring to the accompanying drawing, wherein:

Figure 1 is a partial, vertical, central sectional view through an electric cooker made in accordance with the present invention, one-half of the said cooker being shown in elevation.

Fig. 2 is a vertical sectional view through the cooker taken on line II—II of Fig. 1.

Fig. 3 is a side elevation of the holder entirely removed from the operative position.

Fig. 4 is an enlarged, longitudinal, central sectional view through one of the coil surrounded housings.

Fig. 5 is a cross-sectional view through one of the housings taken on line V—V of Fig. 4.

Fig. 6 is a fragmentary, sectional view through a portion of the skillet receiving housing taken on line VI—VI of Fig. 2, and Fig. 7 is a wiring diagram of the electrical circuit employed in the electric cooker.

Only one embodiment of the invention is illustrated in the accompanying drawing and the numeral 10 designates a housing in general that may be made of sheet metal and assembled in any suitable fashion so as to present a slightly inclined front wall having a glass panel 12 therein behind which is placed any number of electric lamps 14 so as to illuminate a sign or desired indicia that may be painted upon panel 12. The back wall of case 10 is provided with a door 16 that may be moved to and from the closed position through the medium of hinges 18 so as to permit the placement of a drain tray 20 which is removably positioned within case 10 upon a suitably disposed shelf 22. This drain tray 20 is below a series of housings 24 each of which is provided with one open side so as to cooperate with respective openings 26 formed in the front wall of case 10.

Each housing 24 is like the other two illustrated in the drawing and the specific manner of constructing these novel housings is clearly shown in Figs. 4 and 5. A tubular inner lining 28 is closed at one end and provided with a drain opening 30 at the lowermost part thereof, and an annular flange 32, integral with inner lining 28 bears against the inner face of the front wall of case 10. A screw-threaded portion 34 receives a nut 36 which is moved against the outer face of the front wall of case 10 and cooperates with annular flange 32 in maintaining the housing 24 in a position inclined from the horizontal as the drawing indicates. Aluminum or other metal having a high heat conductive ability is preferably used in the formation of this inner lining 28 and a layer of mica 38 is wrapped around lining 28 just before the resistance wire 40 is coiled thereabout. After this electrical resistance wire 40 is coiled about the mica and inner lining 38 and 28 respectively, a coating of asbestos or similar insulating material 42 is placed around the wire so as to direct as far as possible the heat inwardly toward the inside of inner lining 28. A holder indicated generally by the numeral 44 is specially formed to hold a frankfurter or wiener such as is commonly sold to the trade as "hot dog". This holder comprises a series of resilient wires 46 flared outwardly as at 48 at one end and secured to a cover 50 at the other end thereof. Cover 50 has a suitable knob 52 formed thereon so that the holder 44 may be easily and quickly moved to and from a position within housing 24. When the holder is in the operative position members 46 will be spaced from the inner lining 28 and cover 50 will completely close the open side of inner casing 28 so that a sealed cooking compartment is afforded. Wires 46 are specially formed and each is a U-shaped member having the ends of the legs of each member secured to the cover. The bights of each U-shaped member is the portion thereof angled outwardly so that a frankfurter having a diameter slightly greater than the diameter of the circumscribing path wherein is disposed the series of U-shaped members, may be easily inserted into the holder.

As the article of food is cooked and as grease or oil is emitted therefrom, the latter will drop down on to the lowermost portion of inner case 28 and be drained therefrom through opening 30 and thence into tray 20. The three housings 24 shown in Fig. 1 are all disposed over tray 20 so that any drip from any one will fall directly into tray 20. The larger housing which is used for the preparation of hamburgers or similar foods is of a slightly different form than housings 24 but made up in precisely the same manner. The inner case 54 should be of aluminum or other material which readily conducts heat and a covering of mica 56 is spread over inner case 54 before wire 58 is wound there around. After the wire is positioned a coating of asbestos or similar material 60 is combined with the remaining parts of the housing.

A skillet or the like 62 forms the commodity holder for food to be prepared in housing 54 and this skillet is attached to a cover 64 for the large opening in case 10 which is in communication with the open side of housing 54. A handle 66 is provided to allow easy manipulation of skillet 62.

All of the several housings employed in this electric cooker are electrically heated and a switch 68 is used to govern the flow of current to wire 58 and a switch 70 is associated with each coil 40 forming a part of each housing 24 respectively. The wiring diagram therefore, will readily indicate the manner of connecting the heating elements 40 and 58 respectively to a source of supply. Lines 72 and 74 extend from any generator to a point accessible to the user of this cooker and when any one of the three coils 40 is to be brought into use the appropriate switch 70 is closed. Switch 68 is of a character permitting a high, medium or low temperature and but a portion of coil 58 is used when medium or low temperature is desired.

Electric lamps 14 may be placed in the circuit with the heating elements if desired so as to indicate when the cooker is in actual operation.

It is obvious from Fig. 2 that the various food receiving housings are in spaced relation and that any one may be used independently of the other. Modifications with respect to specific structural details and combination of parts will become apparent to one skilled in the art and while the preferred form of the invention has been illustrated and described it is desired to be limited only by the spirit of the invention and scope of the appended claim.

Having thus described the invention what I claim is:

An electric cooker of the character described comprising a case having an inclined front wall provided with an opening; a vertical rear wall having an opening lower than the opening in the front wall; a housing supported within the case by the said front wall, extending toward and terminating a distance from the said rear wall; a drain tray normally positioned below the inner end of the housing and removable from the case through the opening formed in the said vertical rear wall; an electric current resistance wire wound around said housing; a drain element formed on the inner end of said housing above the said tray; a cover for the opening through the said inclined front wall; and a holder carried by the cover extending into said housing when the cover is in the operative position, the axis of said holder being perpendicular to the inclined plane of said front wall.

ELMER LEWIS.